Aug. 22, 1950
G. A. COLLENDER
2,519,742
STEERING LINKAGE FOR HEAVY-DUTY MULTIPLE-WHEELED VEHICLES
Filed Nov. 23, 1945
4 Sheets-Sheet 1
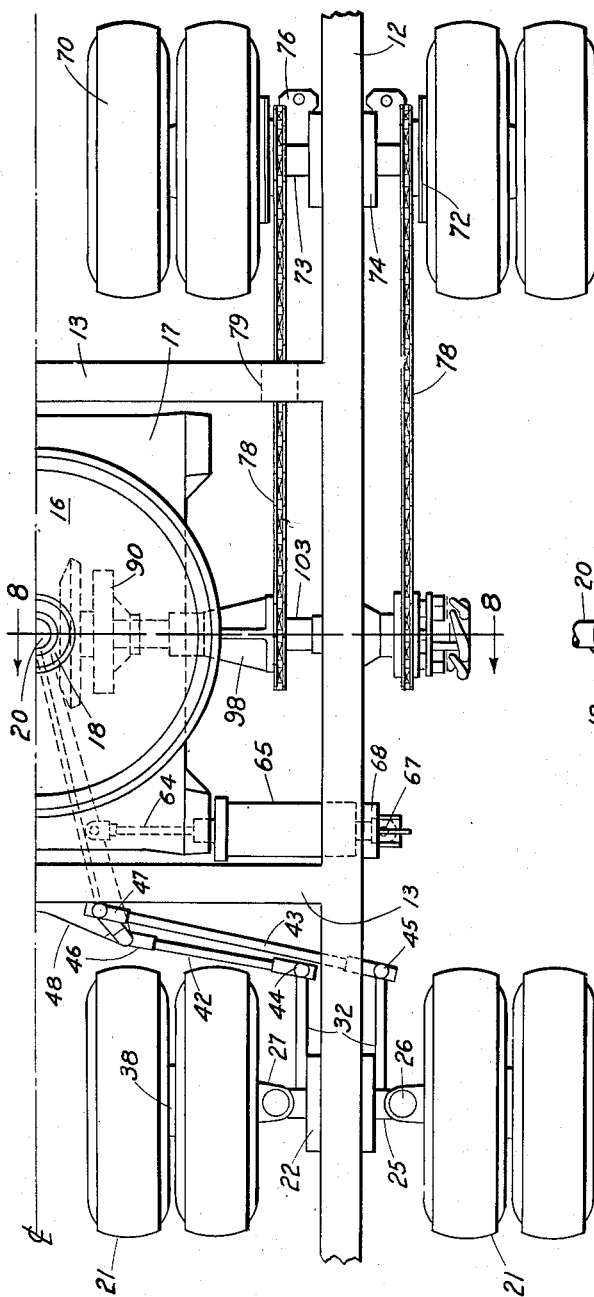
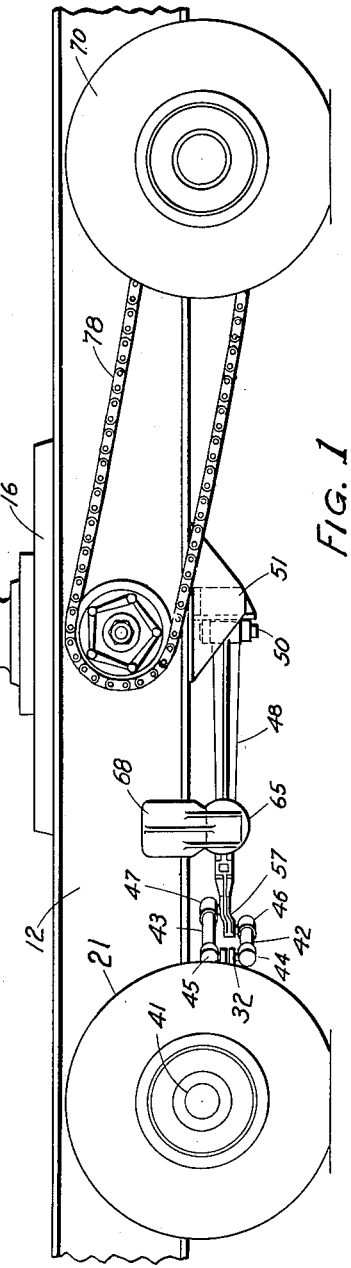
Inventor
GUSTAVE A. COLLENDER
By Ralph L. Stevens
Attorney

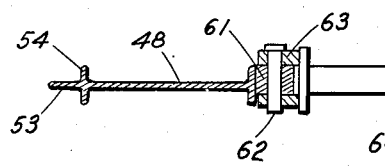
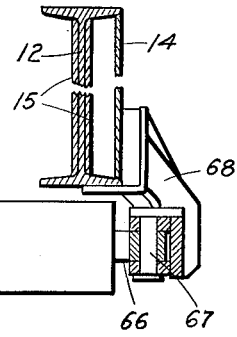
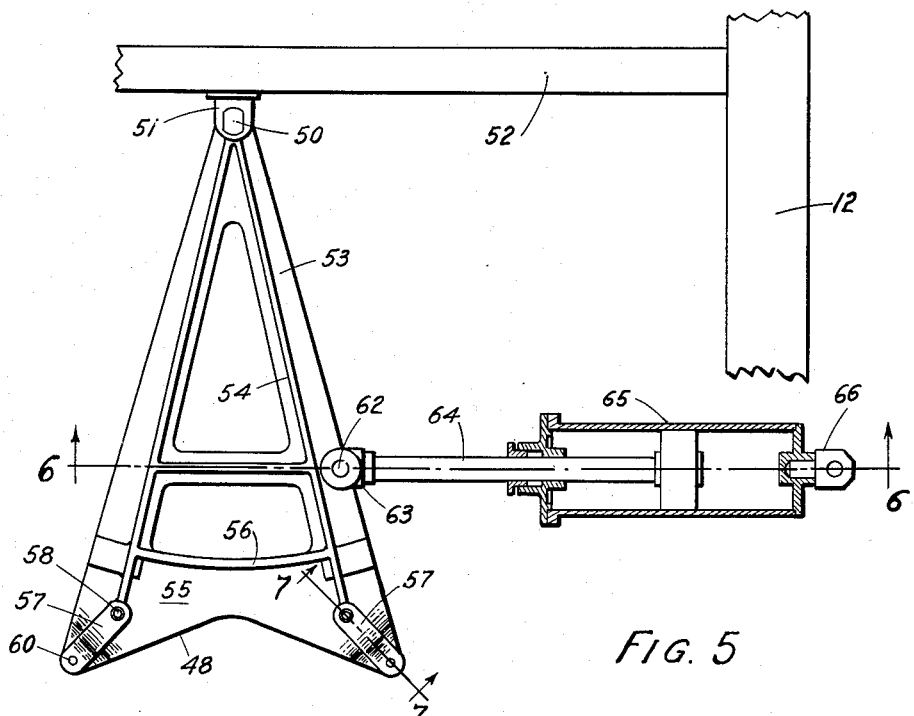
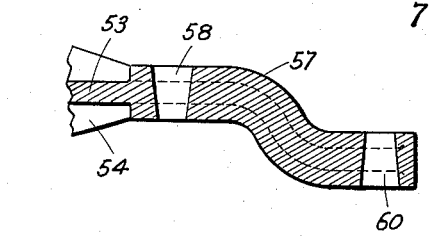
Fig. 6
Fig. 5
Fig. 7
Inventor
GUSTAVE A. COLLENDER
By Ralph L. Stevens
Attorney

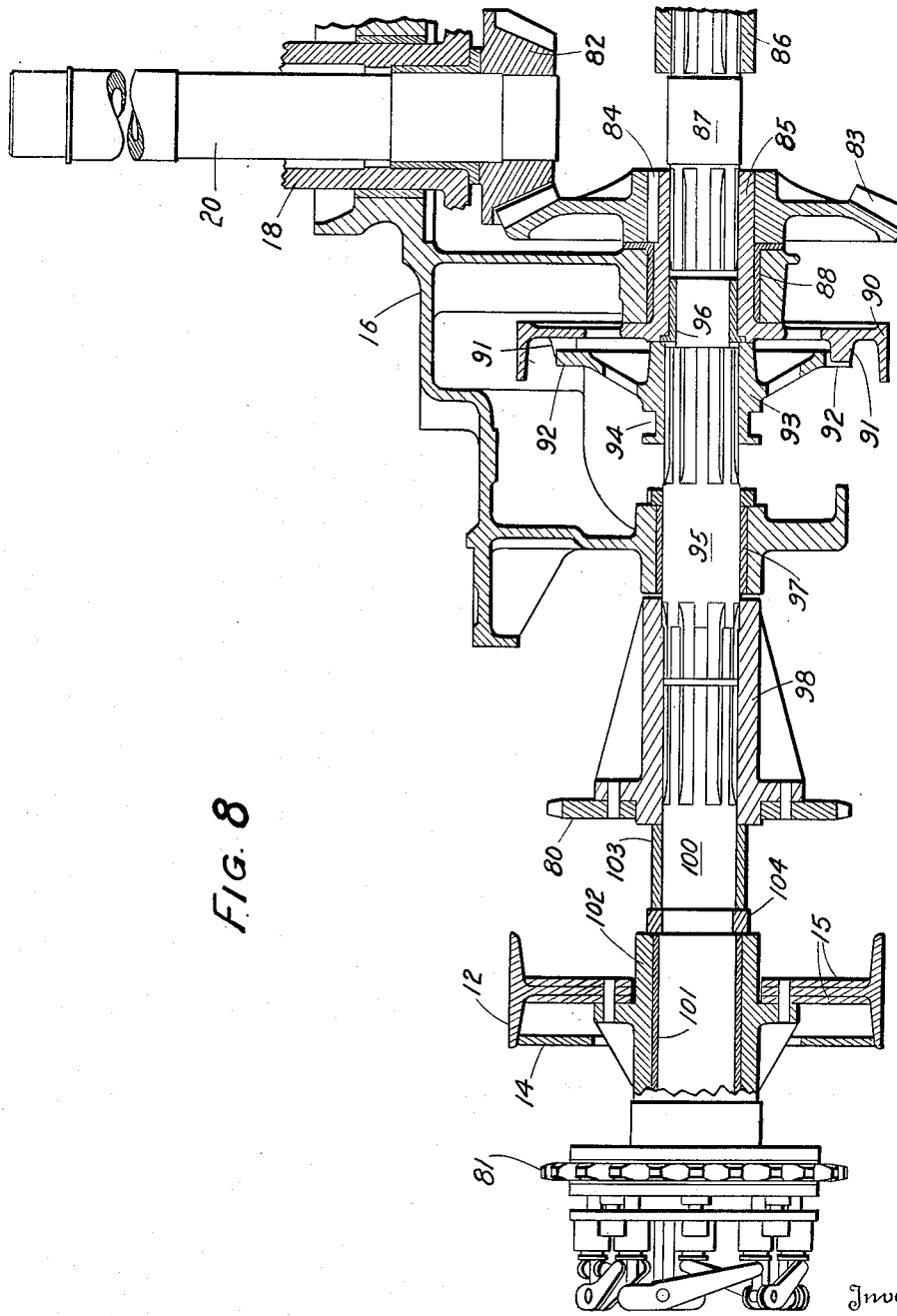

Patented Aug. 22, 1950

2,519,742

UNITED STATES PATENT OFFICE 2,519,742

STEERING LINKAGE FOR HEAVY-DUTY MULTIPLE-WHEELED VEHICLES

Gustave A. Collender, Los Angeles, Calif., assignor to Six Wheels, Inc., Los Angeles, Calif., a corporation of California Application November 23, 1945, Serial No. 630,286

4 Claims. (Cl. 280—81.5)

This invention relates to wheeled vehicles of the industrial type, and especially to vehicles designed to carry extremely heavy loads such, for example, as heavy duty cranes.

More particularly, the present invention is concerned with a vehicle chassis of the type having a multiplicity of wheel axles that are unsprung relative to the frame and supported by rows of closely spaced wheels to give the vehicle high stability and to afford adequate area of ground surface engagement under all conditions of operation.

It is the primary object of my invention to provide a steerable and self-propelled vehicle of the above type, improved to afford greater strength throughout and to facilitate all phases of its operation.

It is another major object to devise, for supporting either the front or the rear end or both ends of a chassis frame, an arrangement of at least four transversely aligned wheel units. This preferably is accomplished by disposing the wheel units in complemental pairs, each pair comprising wheels interconnected by a rocking beam.

Each wheel unit may embody single or dual wheels and, when the units are dual and dirigible, it is an object of this invention to supply a unit in which the two wheels are independently rotatable. In this connection, it is a further object to devise a dual wheel permitting differential rotation of the two wheels and for use in any type of vehicle at any point where a dual wheel is desirable.

A further important object of the present invention resides in the provision of a new and improved steering mechanism that is particularly useful in association with dirigible dual wheel units, and even more so when there are four transversely aligned wheel units to be steered.

The foregoing and other important objects of my invention should be clear and understood after a study of the following detailed description when taken in conjunction with the accompanying drawings and the appended claims.

In the drawings:

Fig. 1 is a side elevational view of a crane undercarriage embodying a preferred form of the present invention.

Fig. 2 is a top plan view of one half of the vehicle of Fig. 1, divided by a vertical plane passed through the longitudinal center of the vehicle.

Fig. 5 is an enlarged fragmentary view, generally in plan but partially in section, of a portion of the power operated steering mechanism.

Fig. 6 represents a vertical section taken substantially along the line 6—6 of Fig. 5.

Fig. 7 is a greatly enlarged detail as seen in section along the line 7—7, Fig. 5.

Fig. 8 is an enlarged view, chiefly in vertical section, of one of the chain-driving jackshaft assemblies and its primary driving means, taken along the line 8—8, Fig. 2.

Figure 3:
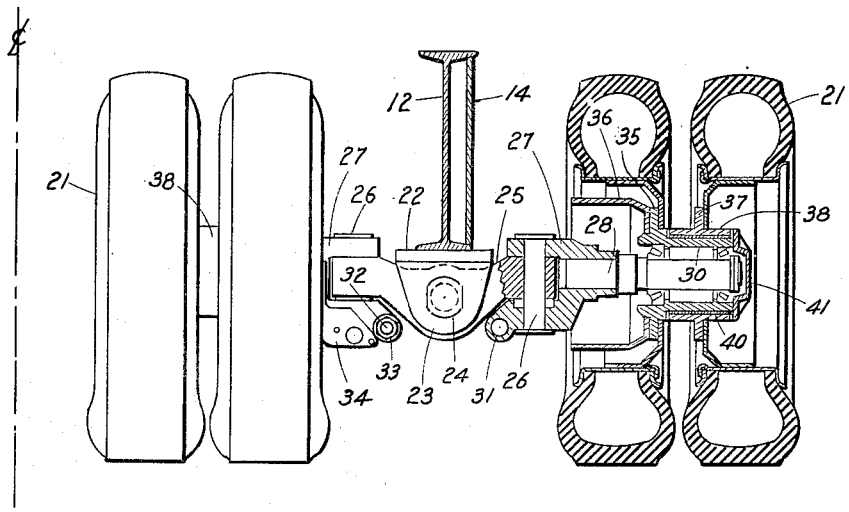
Fig. 3 represents a front elevational view, partially in vertical section for compactness and completeness of illustration, as seen when looking towards the left end of that half of the vehicle seen in Fig. 2.
Figure 4:
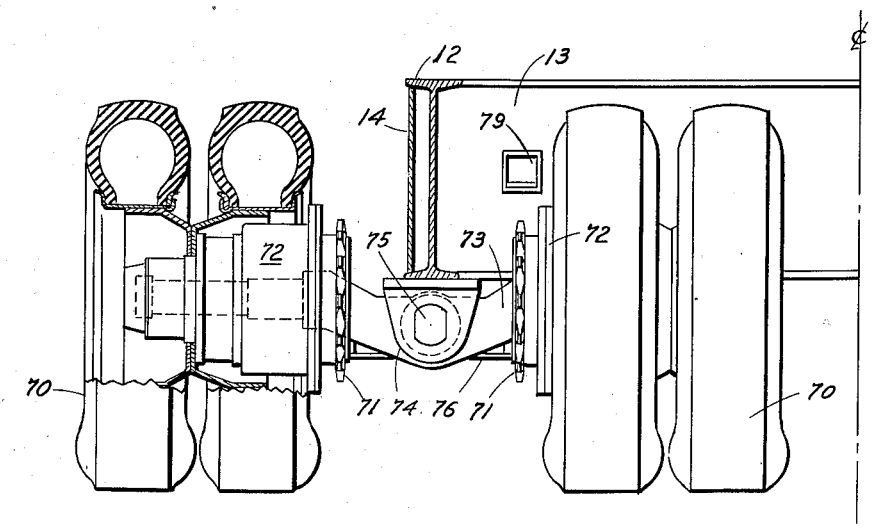
Fig. 4 is a similar view, but looking into the rear end of the vehicle from the right hand end of Fig. 2.

With continued reference to the drawings, and particular reference first to Figs. 1 to 4, the vehicle framework comprises a pair of longitudinal members 12 interconnected by a plurality of cross members, including members 13. Each member 12 is in the form of an I-beam, and at its outer side is strengthened by an elongated plate 14 that may be welded thereto. The zones between the cross members 13 may be further reenforced by plates 15 which fit snugly against the bottoms of the I-beam channels (see also Figs. 6 and 8). This framework supports in conventional manner a bull wheel 16 and its platform 17 for cooperation with a crane superstructure, not shown.

The bull wheel surrounds a central sleeve 18 which in turn affords bearing support to a vertical hollow propeller shaft 20 that can be driven from the crane power plant in the super structure. The purpose of making the shaft hollow is to permit fluid pressure lines (not shown) to extend downwardly from the crane cab for power operation of the vehicle brakes and steering mechanism. Such a system is fully disclosed in my copending application, Serial No. 591,286, filed May 1, 1945.

The front end of the vehicle is supported in unsprung relation by two pairs of wheel units, each designated in entirety by the numeral 21 and preferably comprising a dual wheel so that there is a total of eight tired wheels at the front end. The wheel units of each pair are at opposite sides of one of the longitudinal frames 12 and designed to support the latter in close proximity to the ground, as follows.

A bracket 22, having an integral clevis-shaped portion 23, is secured to the bottom of an appropriate I-beam 12, and a heavy pin 24 passes through the portion 23 and centrally through a rocking beam 25 to pivot the latter for swinging movement in a transverse plane. The ends of the beam are vertically apertured for reception of king pins 26, which, together with pivoted yokes 27 form steering knuckles for the wheel units. A stub axle 28 is set into each yoke and at its outer end rotatably supports a wheel hub 30. The yokes 27 are apertured at 31 for reception of steering arms 32 that are locked in place by nuts 33. Pads 34 (one removed in Fig. 3) are attached to the yokes to serve as mountings for the usual brake actuating motors, not shown.

Each wheel hub 30 has an integral flange 35 to which may be bolted a brake drum 36 and one of the wheels that makes up the dual unit. The other wheel of the pair is not secured to the hub, but to the radial flange 37 of a sleeve 38 that is rotatable about a bearing 40 fitted between it and the hub. A cap 41 is secured to the outer end of the hub to hold the sleeve 38 and its adjacent bearings in position.

As the result of this arrangement, affording differential rotation between the two wheels of each dual unit, steering is made easier and—more important—excessive drag and wear upon the tires is avoided when the vehicle travels in a curved path. This feature of course can be adapted to any axle assembly having non-driven wheels. For that matter, it also may be applied to a dual wheel unit where one only of the wheels is driven.

The rear ends of each pair of the steering arms 32 are connected to links 42 and 43 by conventional ball joints 44, 45; and the links in turn are connected by further ball joints 46, 47 to a special wishbone plate 48.

With reference to Figs. 5 to 7, the apex of the plate 48 is pivotally connected by a vertical pin 50 to a bracket 51 that is secured in the medial plane of the vehicle to a cross member 52 at a point directly below the bull wheel center. The plate preferably takes the form of a flat member 53 shaped substantially like the letter A and strengthened by a similarly shaped integral rib formation 54. The large end of this "A" structure is closed by an integral flat portion 55, reenforced by a rib 56.

The divergent ends of the legs of the rib structure 54 merge into a pair of angularly offset and downwardly bent enlargements 57, each having a pair of vertical holes 58, 60 for reception and anchorage of the pins of the conventional ball joints 47, 46. When the wishbone plate is in its straightaway or medial position as in Fig. 5, the wheel units are parallel to each other and to the side frames. Upon swinging the plate horizontally to right or to left, the predetermined coordination of the steering linkages causes the four wheel units to assume proper angular positions for maximum steering efficiency.

The steering mechanism preferably is actuated from the power plant. A desirable form of operating means, as illustrated, comprises a lug 61 secured to one edge of the plate 48 adjacent its wide end, a vertical pin 62, pivotally connecting the lug with a clevis 63 attached to one end of a piston rod 64, and a conventional piston and cylinder assembly 65 which receives the other end of the rod. The outboard end of the cylinder unit has an integral eye 66 which is pivotally connected by a pin 67 to a portion of a bracket unit 68. The latter is rigidly secured to the adjacent reenforced side frame member 12.

The assembly 65 operates as a conventional servo-motor in obvious manner. Fluid lines (not shown) are brought downwardly from the super- structure, through the hollow propeller shaft 20 and thence into connection with the cylinder, as disclosed in my aforementioned prior application.

The rear end of the vehicle framework is supported by four dual wheel units 70, non-dirigible and each carrying a sprocket plate 71 to afford traction. The wheels of each unit and also its sprocket plate are secured to a brake drum 72 that is rotatably mounted upon one end of a rocking beam 73. There are two of these beams, each pivotally connected between its ends to a clevis-shaped bracket 74 by a horizontal pin 75. The flat bottoms of the brackets fit against and are secured to the I-beams 12, and hence the driven wheel units are aligned substantially fore and aft of the vehicle with the front wheel units. Each rocket 73 carries a pair of pads 76 for the mounting of conventional brake operating motors and linkages (not shown).

The driven sprockets 71 at each side of the vehicle are engaged by a pair of chains 78 that extend upwardly—one of them through a hole 79 in the rear cross member 13—to encompass two complemental sprocket plates 80 and 81 that are mounted on a jackshaft assembly about to be described.

A pinion 82 is secured to the lower end of the propeller shaft 20, and meshes with a bevel gear 83 that is keyed at 84 to a sleeve 85 to rotate the latter in a zone at one side of the vertical central plane of the vehicle. A similar sleeve 86 (Fig. 8) is disposed at the other side of the central plane, but there is no second bevel gear to drive it since it receives its torque through a splined connection with a short shaft 87 which is in splined coupling with the sleeve 85. In all other respects the jackshaft housing assembly partially shown in Fig. 8 is identical at opposite sides of the vertical longitudinal plane that passes through the axis of the propeller shaft 20.

The sleeves 85 and 86 have frame-supported bearings 88, and have integral radial spiders 90 equipped with rings of clutch dogs 91 that face laterally outwardly. These dogs on each spider are complemental to a plurality of spaced fingers 92 formed upon and extending radially from a hub 93 that has a peripheral groove 94 for coaction with a conventional clutching and declutching fork (not shown). The hub 93 is slidably splined upon a shaft 95 that is rotatable in frame-supported bearings 96 and 97.

Each hub 93 may be selectively moved into and out of locking engagement with its adjacent spider 90 by any suitable arrangement of servomotors and forks such, for example, as disclosed in my copending application, Ser. No. 567,330, filed December 9, 1944, and now abandoned. The purpose of these clutches is to permit either pair of traction wheel units (at one side or the other of the vehicle) to be driven to the exclusion of the other pair, thus to facilitate steering the vehicle on sharp turns or when the supporting terrain renders steering difficult even for gradual turns. Of course the clutches can be simultaneously engaged for normal travel.

Each sprocket plate 80 is bolted to a heavy sleeve 98 that is in splined connection at one end with its adjacent shaft 95, and that is similarly connected at its other end to a shaft 100 to drive the latter. The shaft 100 has a bearing 101 in the region of the reenforced side frame member and projects outwardly therebeyond to drive the sprocket 81 through a differential mechanism about to be described. The bearing 101 is telescoped in a sleeve 102 that is bolted to the frame structure, as shown. The sleeves 98 and 102 are separated by spacers 103, 104. The shafts 95 and 100 could be made in one piece, but preferably are separate for maximum strength and for convenience of assembly.

The slipping or differential clutches shown between the jackshaft assembly and the outside chains 78 are fully disclosed and claimed in my copending application, Serial No. 742,921, filed April 21, 1947, and hence are not described in detail here. This application has become Patent No. 2,515,986, July 18, 1950.

The general operation, and the modes of functioning of the various units are believed to be clear from the preceding running description. As the two types of differential action are automatic, only the power steering unit, the brakes and the mechanical clutches require manual control. The arrangement is such that the same man who operates the crane can also conveniently manipulate the control devices for the undercarriage.

Obviously, numerous changes in many of the mechanisms and their parts may be made without departing from the spirit of the present invention. Also, although the vehicle is designed primarily as a crane carriage it is readily adaptable to numerous other uses. Therefore, I wish to be limited, as is customary, only by a reasonably liberal interpretation of the scope of the appended claims.

What is claimed is:

1. In a vehicle chassis having the usual longitudinally arranged framework, a pair of transversely aligned suspension assemblies, one at each side of the framework; each assembly comprising a relatively short beam pivotally connected to the framework between its ends to rock in a vertical transverse plane, a steering knuckle at each end of the beam and carrying a stub axle, a wheel unit rotatable upon each axle, and a steering arm attached to each knuckle; and a steering linkage connecting said arms together and to the framework.

2. In the combination defined in claim 1, said steering linkage comprising an approximately wishbone-shaped plate arranged horizontally and connected to said framework by a vertical pivot at its apex, a pair of links connecting the steering arms of each suspension assembly to the adjacent divergent corner of said wishbone-shaped plate, and means for oscillating said plate about its vertical pivot.

3. In a steering linkage for a multiplicity of axially aligned dirigible wheels, an approximately A-shaped plate having a hole normal thereto adjacent its vertex, said plate having a substantially A-shaped set of strengthening ribs integral therewith and arranged substantially perpendicular thereto and coextensive therewith, the divergent ends of said ribs terminating and merging into angularly offset enlarged portions at the divergent corners of the plate, each of said enlarged portions having a plurality of spaced apertures the axes of which are normal to the plate.

4. In combination with the front end of a vehicle chassis framework, a pair of individually dirigible wheel units at each side of the framework and connected thereto by means including steering knuckles, a steering arm secured at one end to each knuckle and extending rearwardly, a pair of steering links pivotally connected to the rear ends of each pair of arms and having inward ends extended toward the center line of the vehicle, a wishbone-shaped device connected at its apex to said framework for swinging movement from one side of said center line to the other in a horizontal plane, the said inward ends of each pair of links being pivotally connected at spaced points to one of the divergent ends of said wishbone-shaped device, the arrangement being such that all of the wheel units are properly correlated for steering action, and means for actuating said wishbone-shaped device.

GUSTAVE A. COLLENDER.

REFERENCES CITED

The following references are of record in the file of this patent:

UNITED STATES PATENTS

| Number | Name | Date |
|---|---|---|
| 903,884 | Przygode | Nov. 17, 1908 |
| 1,923,397 | Robin | Aug. 22, 1923 |
| 1,953,510 | Schultz et al. | Apr. 3, 1934 |
| 1,976,068 | Higbee | Oct. 9, 1934 |
| 2,246,609 | Townsend | June 24, 1941 |
| 2,292,210 | De Santro et al. | Aug. 4, 1942 |
| 2,361,268 | Cochran | Oct. 24, 1944 |

FOREIGN PATENTS

| Number | Country | Date |
|---|---|---|
| 404,130 | Great Britain | Jan. 11, 1934 |
| 839,712 | France | Jan. 7, 1939 |